US008518315B2

(12) United States Patent
MacDonald et al.

(10) Patent No.: US 8,518,315 B2
(45) Date of Patent: Aug. 27, 2013

(54) PLASTICIZER FOR THERMOPLASTIC MATERIALS

(75) Inventors: John G. MacDonald, Decatur, GA (US);
Teuta Elshani, Roswell, GA (US);
Hristo A. Hristov, Roswell, GA (US);
Molly K. Smith, Atlanta, GA (US);
Ilona F. Weart, Woodstock, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1285 days.

(21) Appl. No.: 12/340,409

(22) Filed: Dec. 19, 2008

(65) Prior Publication Data
US 2010/0159769 A1    Jun. 24, 2010

(51) Int. Cl.
*B29C 43/22*    (2006.01)
*B29C 53/00*    (2006.01)

(52) U.S. Cl.
USPC ............ 264/280; 264/239; 264/901; 523/118

(58) Field of Classification Search
USPC ......... 523/118; 442/286, 181, 394; 264/239, 264/280
See application file for complete search history.

(56) References Cited

U.S. PATENT DOCUMENTS

| 3,903,024 | A | 9/1975 | Wright |
| 5,504,184 | A | 4/1996 | Caruso et al. |
| 6,136,326 | A | 10/2000 | Kotzev |
| 6,224,622 | B1 | 5/2001 | Kotzev |
| 6,281,310 | B1 | 8/2001 | Kotzev |
| 2001/0001690 | A1 | 5/2001 | Phillips |
| 2003/0065069 | A1* | 4/2003 | Wojciak ..................... 524/107 |
| 2004/0022755 | A1 | 2/2004 | Kamath |
| 2008/0060550 | A1* | 3/2008 | MacDonald et al. ...... 106/162.1 |
| 2008/0145316 | A1* | 6/2008 | MacDonald et al. ........ 424/10.3 |
| 2008/0161508 | A1 | 7/2008 | Matsumoto et al. |
| 2009/0098073 | A1 | 4/2009 | MacDonald et al. |
| 2009/0098081 | A1 | 4/2009 | MacDonald et al. |

FOREIGN PATENT DOCUMENTS

EP    1 580 229 A1    9/2005

OTHER PUBLICATIONS

Lillie, R.D., M.D., "Xanrhenes and Acridines," Chapter 13, *H.J. Conn's Biological Stains*, 9th Edition, Williams & Wilkins, 1977, pp. 326-363.

Tsuji, Hideto and Yoshito Ikada, "Blends of Crystalline and Amorphous Poly(lactide). III. Hydrolysis of Solution-Cast Blend Films," *Journal of Applied Polymer Science*, vol. 63, No. 7, Feb. 14, 1997, pp. 855-863.

* cited by examiner

*Primary Examiner* — Lynda Salvatore
(74) *Attorney, Agent, or Firm* — James B. Robinson; Vincent T. Kung

(57) ABSTRACT

A thermoplastic polymeric composition including a xanthene or xanthenes-based compound as a plasticizer, a method to modify the thermoplastic polymeric materials to increase their relative plasticity, and various articles of manufacture that can be made using the polymer composition are described.

11 Claims, 2 Drawing Sheets

PLASTICIZER FOR THERMOPLASTIC MATERIALS

FIELD OF INVENTION

The present invention pertains to certain chemical additives that can be incorporated into thermoplastic polymeric materials to increase the relative plasticity of the polymeric material. In particular, the present invention relates to the plasticizing effect of xanthenes or xanthene-based molecular structures in crystalline thermoplastic polymers.

BACKGROUND

Molecular shape and the way molecules are arranged in a solid are important factors in determining the macroscopic physical properties of polymers. The relative degree of either brittleness or plasticity of a particular polymer material is dependent on the molecular structure, conformation and orientation of the polymer. The general concept of self-assembly enters into the organization of molecules on the micro and macroscopic scale as they aggregate into more ordered structures. Crystallization of regular solids is an example of the self-assembly process, as is the spatial organization of liquid crystals.

Conventional thermoplastic polymers, such as polypropylene or polylactic acid, tend to be relatively hard and rigid, sometimes even brittle. Manufacturers have over the years tried to develop or modify conventional thermoplastic materials to make them more pliable or "softer," but few have had success. This need for a new material composition or method to modify the thermoplastic polymeric materials to increase their relative plasticity remains unsatisfied. The present invention provides a plasticizer composition to address this need.

SUMMARY OF THE INVENTION

The present invention pertains to, in part, a thermoplastic polymeric composition having a semi-crystalline polymer with a minimal crystalline content of about 5% to about 80% by weight of the polymer. and a plasticizer compound with a xanthene-based molecular structure dispersed among the polymer molecules, in an amount up to about 4 wt. %. When solidified at ambient room temperature, the polymer composition a mesophase, a crystalline phase, and an amorphous phase in a ratio range of about 1-5:5-9:8-12, respectively. The plasticizer compound with a xanthene-based molecular structure is dispersed within the mesophase and amorphous phase. The resulting thermoplastic polymeric composition has a relative level of crystallinity of about at least 5% less than that of the starting or a control thermoplastic polymer that does not include the plasticizer compound with a xanthene-based molecular structure therein. The mesophase and crystalline phase are each reduced by an amount of about 10-50% relative to the percentage of mesophase and crystalline phase of an identical composition absent the plasticizer compound.

Incorporation of the plasticizer compound into the thermoplastic polymeric composition can increase the relative stress-strain tolerance of the base or underlying thermoplastic polymer by about at least 7% or 8%, and the relative tolerance for stretching and elongation by about at least 4% or 5%, and increase in the relative amount of shear force (lb.F.) tolerance to pull apart the polymer planes by about at least 5% or 6%.

The semi-crystalline polymer may include, for example, polypropylene, polyvinyl chloride, polylactic acid, polystyrene, or high-density polyethylene. The semi-crystalline polymer can contain a crystalline content of about 28% to about 70% crystalline phase, 10% to about 25% mesophase, about 30% to about 55% amorphous state. The plasticizer compound with a xanthene-based molecular structure is present at about 500 ppm (0.05 wt. %) to about 20,000 ppm (2 wt. %), and may include xanthene and halogenated or mixed-halogenated xanthenes.

In another aspect, the present invention relates to an article of manufacture made with a semi-crystalline thermoplastic polymer matrix that incorporates a plasticizer having a xanthene molecule or a compound with a xanthene-based molecular structure. The article of manufacture can be a film, a fiber, woven fibers, or nonwoven fiber web, absorbent articles (e.g., wipers, diapers, adult incontinence products, feminine pads), garments, protective fabrics and suits (e.g., surgical gowns or drapes, work overalls, dust or chemical protective outfits), wrapper or packaging materials or articles (e.g., diaper bag), face-masks, medical drapes, endotracheal tube, catheters, bladders or balloons, or any other item that may require a certain degree of flexibility or pliability and perceived tactile softness.

In another aspect, the present invention also pertains to a method of modifying the plasticity of a crystalline-phase-containing thermoplastic polymer. The method involves providing in a mixture a thermoplastic polymer with about 7% or 8% to about 75% or 80% crystallinity and a plasticizing agent having a xanthene-based molecular structure present in an amount of up to about 2 wt. % or 4 wt. % of total composition; thoroughly mixing the thermoplastic polymer and said plasticizing agent in a molten or liquid state between a temperature range of about 140-300° C.; and dispersing uniformly the plasticizing agent throughout the molten mixture; and solidifying the molten mixture such that the xanthenes or xanthene-based molecular structure migrates into the mesophase and amorphous phase. When solidified the resulting solid exhibits a crystalline content that is at least 5% less than the underlying or original thermoplastic polymer that was without the plasticizing agent. The method may further involve extruding or forming the molten mixture of the hot plasticized thermoplastic material into variety of solid forms or products when at about ambient room temperature.

Additional features and advantages of the present three-dimensional sensor or assay device and associated absorbent articles containing such a sensor will be described in the following detailed description. It is understood that the foregoing general description and the following details description and examples are merely representative of the invention, and are intended to provide an overview for understanding the invention as claimed.

DETAILED DESCRIPTION OF THE INVENTION

Section I.—Definitions

Figure 1:
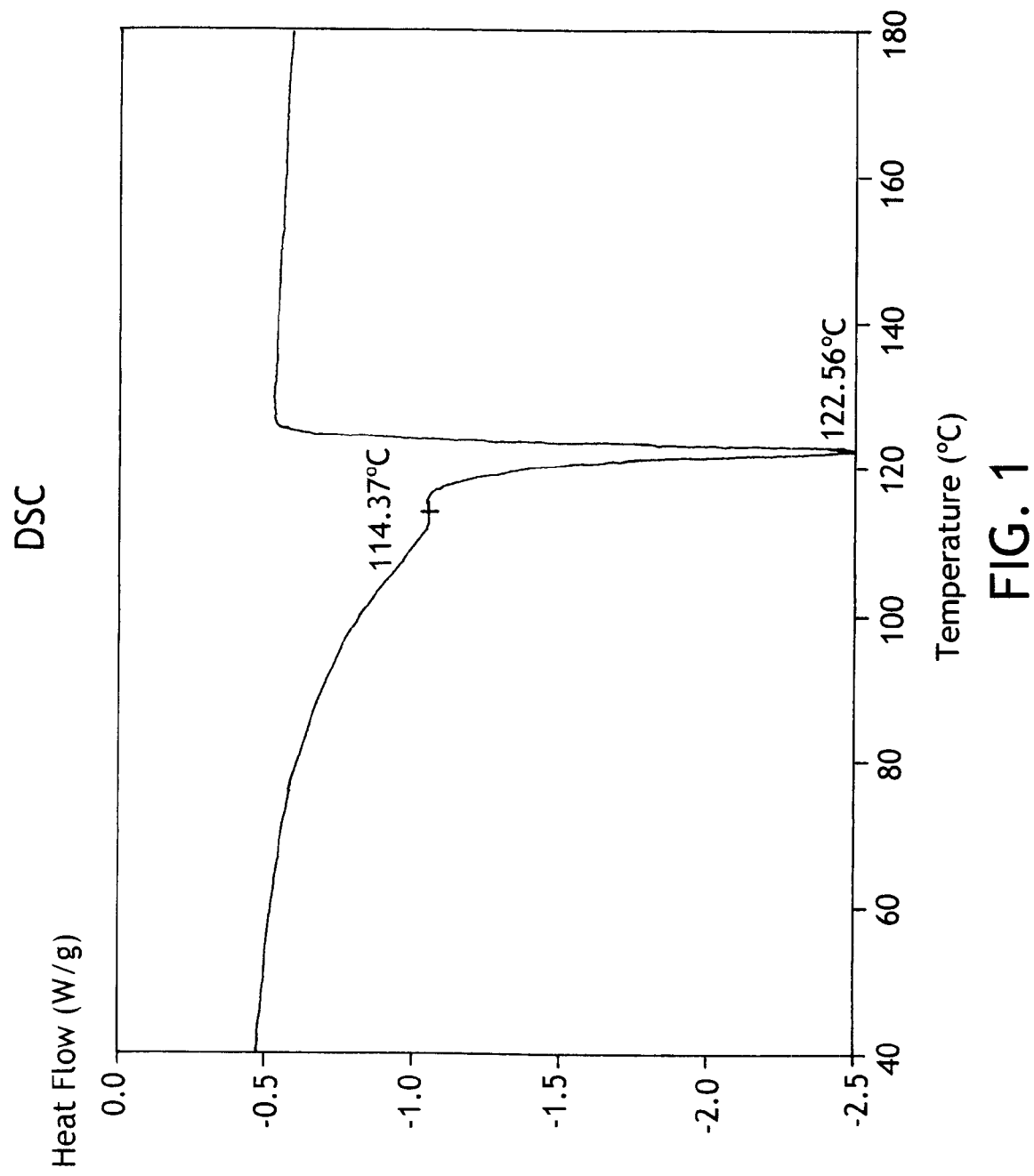
FIG. 1 is a heating curve for a sample of polyethylene having low-crystalline content.

In general, the present invention pertains to thermoplastic polymer compositions that are modified with a plasticizing compound containing a xanthene or xanthene-based molecular structure.

As used herein, the term "thermoplastic polymer" or "thermoplastic material" refers to an organic macromolecule composed of a large number of monomers, with molecular weight that may range from about 5,000 into the hundreds of thousands, which softens when exposed to heat and returns to its original condition when cooled to room temperature, such as polypropylene, polyvinyl chloride, polylactic acid, polystyrene, or high-density polyethylene ("high-density" refers to a PE polymer between about 60%-80% crystalline).

As used herein, a "plasticizer," "plasticizing agent," or "plasticizing compound" is an organic compound that is added to a thermoplastic polymer which can both facilitate processing and increase the flexibility of the final product by modifying the molecular bonds of the polymer. Typically, the polymer molecule is held together by secondary valence bonds. The plasticizer replaces some of these bonds with plasticizer-to-polymer bonds, thus aiding movement of the polymer chain segments.

As used herein, a "xanthene" or "xanthene-based" molecule refers to an unmodified xanthene molecule or a derivative compound with a xanthene ring structure, as shown below. Xanthene $(CH_2(C_6H_4)_2O)$ (dibezopyran, tricyclic), a yellow organic heterocyclic compound, has the following chemical structure:

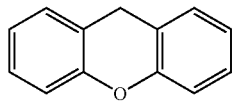 [SMILES: c1ccc2c(c1)Cc1ccccc1O2]

It is soluble in ether, and its melting point is 101-102° C. and its boiling point is 310-312° C. Xanthene is commonly used as a fungicide and is also a useful intermediate in organic synthesis. The xanthene molecule can be halogenated (F, Cl, Br, I). Halogenated xanthene structures may include, for example, mono-fluoro, di-fluoro, tri-fluoro, or tetra-fluoro-fluoresceins; mono-chloro, di-chloro, tri-chloro, tetra-chloro-fluorescein; mono-bromo, di-bromo, tri-bromo, or tetra-bromo-fluoresceins; or mono-iodo, di-iodo, tri-iodo, or tetra-iodo-fluoresceins, and mixtures thereof. Additionally, mixed halogenated xanthenes structures such as tetra-bromo-tetra-chloro-xanthene (e.g., Drug & Cosmetic (D&C) Red No. 27) are also contemplated.

Section II.—Description

Although some polymers may be completely amorphous, the morphology of most polymers is semi-crystalline. That is, they form a combination of crystalline and amorphous portions with the amorphous regions surrounding the crystalline areas. The mixtures of small crystals and amorphous material melt over a range of temperature instead of at a single melting point. The crystalline material tends to have highly ordered and regular structures formed by folding and stacking of the polymer chains. The amorphous structure, in contrast, shows no long range order, and have molecular chains are arranged randomly and in long chains which twist and curve around one-another, making large regions of highly structured morphology unlikely.

The highly ordered crystalline structure and amorphous morphology of certain polymer materials determine the differing behaviors of the polymer. An amorphous solid is formed when the chains have little orientation throughout the bulk polymer. The glass transition temperature ($T_g$) is the point at which the polymer hardens into an amorphous solid. The glass transition temperature of a polymer is an important factor in its physical properties and behavior for certain desired uses. As the temperature of a polymer drops below its $T_g$, the polymer behaves in an increasingly brittle manner; while, as the temperature rises above the $T_g$, the polymer becomes more viscous-like. In general, polymers with $T_g$ values of well below room temperature (~20° C.) define the domain of elastomers, and those with values above room temperature define rigid, structural polymers.

The $T_g$ can influence the mechanical properties of the polymeric material; in particular, the response of the material to an application of a force, namely: elastic and plastic behaviors. Elastic materials will return to their original shape once the force is removed. Plastic materials will deform fluidly and not regain their shape. In plastic materials, flow is occurring, much like a highly viscous liquid. Most materials demonstrate a combination of elastic and plastic behavior, exhibiting plastic behavior after the elastic limit has been exceeded. For example, polyvinyl chloride (PVC) has a $T_g$ of 83° C. making it good, for example, for cold water pipes, but unsuitable for hot water. PVC also will always be a brittle solid at room temperature. Adding a small amount of plasticizer to PVC can lower the $T_g$ to about −40° C. This addition renders the PVC a soft, flexible material at room temperature, ideal for applications such as garden hoses. A plasticized PVC hose can, however, become stiff and brittle in winter. In this case, as in any other, the relation of the $T_g$ to the ambient temperature is what determines the choice of a given material in a particular application.

In most polymers, the combination of crystalline and amorphous structures forms a material with advantageous properties of strength and stiffness. According to the present invention, while in furtherance of the work described in U.S. patent application Ser. No. 11/974,369, and Ser. No. 11/974,393, the content of which are incorporated herein by reference, we have discovered that xanthene or xanthene-based compounds can impart significant plasticizing properties to a variety of crystalline or semi-crystalline thermoplastic polymer materials with a crystalline level of more than about 5% or 7%. Examples of suitable xanthene-based compounds include xanthene dyes (e.g., xanthene base structure of fluorescein systems). Xanthene dyes are a class of dyes which includes fluoresceins, eosins, and rhodaminies. They fall into three major categories: the fluorenes or amino xanthenes, the rhodols or aminohydroxyxanthenes, and the fluorones or hydroxy-xanthenes. Lillie, H. J. CONN'S BIOLOGICAL STAINS. p. 326 (Williams & Wilkins, 9th ed. 1977). Xanthene dyes tend to be fluorescent, yellow to pink to bluish red, brilliant dyes. The xanthene structure can have at least one functional R group, where R is hydrogen or halogen. The modulus of the fluorescein containing thermoplastic polymers is lower than those of the corresponding control thermoplastic polymers by about at least 5%-10%.

According to embodiments of the invention, xanthene and/or xanthene dyes can be incorporated into the thermoplastic polymer matrix by melt-mixing to enhance the physical plasticity of the resultant composition. Typically, the molten mixture is heated to a temperature of between about 140° C. and 280° C. This temperature can range from about 150° C. or 180° C. to about 230° C., 250° C. or 265° C., depending on the melting temperatures of specific thermoplastic polymers.

Nonetheless, according to the present invention, not all xanthene-based structures function well as a plasticizer. We have found that xanthenes-based compounds with ketone or carboxylic acid analogues (e.g., xanthone and xanthene-carboxylic acid) do not work as well as others since they appear not to impart good plasticizing characteristics, but rather can make the polymer material very brittle, even worse than a control sample of the original thermoplastic polymer material.

According to the present invention, the thermoplastic polymer can be a semi-crystalline polymer material with a minimal crystalline content of about 8% up to about 75% by weight of the polymer. Typical the polymer material has a crystalline content that can range from about 10%, 15% or 20% up to about 67%, 70% or 73% by weight; more typically a crystalline level of about 25% or 30% to about 65%. The plasticizing compound with a xanthene-based molecular structure can be in an amount from about 0.01 wt % up to about 2-3 wt. % or 4 wt. %. Typically, the plasticizing compound with a xanthene-based molecular structure can be present in an amount from about 0.03 wt. %, 0.05 wt. % or 0.1 wt. % to about 1.0 wt %, 1.75 wt. % or 1.8 wt. %, inclusive.

The thermoplastic polymer, according to the present invention, has a mesophase, a crystalline phase, and an amorphous phase in a ratio range of about 2-4:4-8:7-11 respectively (desirably, about 3:7:10: mesophase: crystalline phase: amorphous phase). The mesophase and said crystalline phase are each reduced by an amount of about 7-8% or 10% up to about 40% or 50% relative to the percentage of mesophase and crystalline phase of an identical composition absent the plasticizing compound with xanthene-based molecular structure. The polymer has a mesophase that comprises about 10% or 12% to about 28% or 30% of the polymeric matrix.

In the crystallization process, it has been observed that relatively short chains organize themselves into crystalline structures more readily than longer molecules. Therefore, the degree of polymerization (DP) is an important factor in determining the crystallinity of a polymer. Polymers with a high DP have difficulty organizing into layers because they tend to become tangled. Low molecular weight polymers (short chains) are generally weaker in strength. Although they are crystalline, only weak Van der Waals forces hold the lattice together. This allows the crystalline layers to slip past one another causing a break in the material. High DP (amorphous) polymers, however, have greater strength because the molecules become tangled between layers. In the case of fibers, stretching to 3 or more times their original length when in a semi-crystalline state produces increased chain alignment, crystallinity and strength.

Also influencing the polymer morphology is the size and shape of the monomers' substituent groups. If the monomers are large and irregular, it is difficult for the polymer chains to arrange themselves in an ordered manner, resulting in a more amorphous solid. Likewise, smaller monomers, and monomers that have a very regular structure (e.g. rod-like) will form more crystalline polymers.

The cooling rate also influences the amount of crystallinity. Slow cooling provides time for greater amounts of crystallization to occur. Fast rates, on the other hand, such as rapid quenches, yield highly amorphous materials. Subsequent annealing (heating and holding at an appropriate temperature below the crystalline melting point, followed by slow cooling) will produce a significant increase in crystallinity in most polymers, as well as relieving stresses.

Plastic Thermal Expansion Coefficients

All materials expand with changes in temperature. Table 1, presents the coefficient of linear thermal expansion, shown as a factor m/mk, for a number of common thermoplastic polymers, such as those which may be employed as the underlying crystalline or semi-crystalline polymers in the present compositions, or as a control polymer material. (The calculation is: (given factor)×10−6×length×change in temperature ° C.)

TABLE 1

Coefficients of Thermal Expansion (CTE) for Common Plastics

| Plastic Type | CTE ($\times 10^{-6}$/K at 20° C.) |
| --- | --- |
| PE Polyethylene | 180-200 |
| PP Polypropylene | 200 |
| PTFE Polytetrafluoroethylene | 135 |
| PVDF Polyviylidenefluoride | 130 |
| PTFE Polytetrafluoroethylene | 112-125 |
| Acetal | 110 |
| Nylon | 50-90 |
| PVC Polyvinylchloride | 70-80 |
| PC Polycarbonate | 65 |
| PETP Polyester | 60-65 |
| PSU Polysulphone | 60 |
| PPSU Polyphenylenesulphone | 55 |
| PEEK Polyetheretherketone | 25-50 |
| PPS Polyphenylene Sulphide | 50 |
| PEI Polyetherimide | 45 |
| PAI Polyamide-imide | 25-30 |
| PBI Polybenzimidazole | 25 |

Section III.—Practical Applications

In general, according to the present invention, thermoplastic polymers compositions that have xanthene-based compounds incorporated tend to be less rigid, which appears to be an effect of lowering the crystalline content of the modified or plasticized polymer. Incorporation of the plasticizer compound into the thermoplastic polymeric composition can increase the relative stress-strain tolerance of the base or underlying thermoplastic polymer by about at least 7% or 8%. In certain embodiments, the stress-strain tolerance can be enhanced by as much as 10% or 12% up to about 20%. Strain of a polymer sample is expressed as a percentage (x %) of a sample's original length dimension. The relative tolerance for stretching and elongation is improved by about at least 4% or 5%. This parameter can also be increased by about 8-10%, up to about 15% or 20%. The plasticized thermoplastic material exhibits an increase in tolerance for the relative amount of shear force (lb.F.) applied to pull apart the polymer by at least 5 or 6%, and up to about 8-10% to 15%.

With such properties, films, fibers, and fibers-webs formed from the present compositions tend to be more drapable and ductile. This chracteristic would allow manufacturers to provide garments, covers, wrapping materials, or packages made with woven or nonwoven fabric materials made with such polymers to be more conformable and convey a softer texture to the touch. Garments may include, for example, overalls, gowns, drapes, footwear, gloves, or headwear. Also a more pliable quality of the polymer can result in a quieter film and less "crinkle in noise" when crumbled or crushed. Fibers and fabrics made from those fibers containing the xanthenes-based compounds would be softer and also more drapable. Thus for example, polypropylene nonwoven would be converted into a more polyethylene-like softer fabric (less harsh in feel). This property would be ideal for manufactured articles that incorporate nonwoven layers, especially for those that contact a consumer or user's skin, such as absorbent pads, feminine hygiene pads, diapers, or wash cloths and wipers. In particular, manufacturers can modify existing nonwoven technology and materials, for instance, co-formed fibers or hydroknit fibers, combined films, fibers and webs for laminate structures, such as sponbond, sponbond-meltblown-spunbond, sponbond-film-sponbond. A film can allow for micro-porous pore dimensions of about 10-50-100 microns. Other potential products may include injection or extrusion molded articles, for example, bladders or balloons, catheter tubing, or endotracheal tubes. Conventionally, such tubes and conduits have been made from rather rigid thermoplastic polymers, which may cause pain and tissue damage, if not inserted smoothly along the passageways in a patient's body. A more pliable material that is able to flex when contacting a bend, for instance, in the trachea or esophagus would avoid such injuries. Therefore the uniqueness of this invention is the ability to convert "harder polymers" into softer and more pliable films, fibers, webs made from the fibers, and/or laminate structures.

According to another aspect, the invention discloses a method of plasticizing a thermoplastic polymer containing at least 5-7% crystalline phase. The method comprises: providing in a mixture a polymer with about 30% to about 70% crystallinity and a plasticizing agent having a xanthene-based molecular structure present in an amount of up to about 2.2 wt % or 2.4 wt %, more typically up to about 1.75 or 1.8 wt. %, of total composition; melting the mixture to a temperature between 140° C. or 150° C. up to about 285° C. or 290° C.; and then forming an article from the molten mixture. Structurally, the polymer should contain a mesophase of greater than 27% or 30% of the polymer matrix. In certain polymer materials the mesophase can be between about 33% or 35% up to about 50%.

Section IV.—Empirical
Materials and Methods:

A xanthene series of compounds are obtained from Sigma-Aldrich Chemical Company and used without further purification. The thermoplastic polymers were all obtained from Exxon as pellets. A variety of polymers were selected and used in order to determine the effect of these unusual xanthenes plasticizers on polymers with low percentage crystallinity to highly crystalline. Table 2, summarizes the molecular weights (MW) and percentage crystallinities for the thermoplastic polymers.

TABLE 2

| Polymer | MW | Percent % Crystallinity |
|---|---|---|
| Polypropylene | 300,000 Mn | 40-67 (40-60% isotactic) |
| Polyethylene | 300,000 Mn | 0.54-0.94 |
| Polyvinylchloride | 60,000 Mn | 15 |
| Poly(oxymethylene) | 50,000 Mn | 64-69 |
| Poly(lactic acid) | 7000 Mn | 37 |

The xanthenes were dispersed into the thermoplastic polymers using a twin-screw extruder to ensure that the molecules were homogeneously incorporated throughout the polymer as single molecular species. A change in color often signaled that this had indeed occurred. As an example the 4,5-dibromofluorescein when not dispersed would results the polymer film to be orange in color. If properly dispersed it would be a fluorescent pink in color.

XRD

The film samples were analyzed on an X-ray diffractometer D-max Rapid from Rigaku Corp. equipped with a two dimensional (2-D) position sensitive detector. The measurements were executed in transmission geometry and Cu Kα radiation (λ=1.5405 Angstrom). The results were corrected for background and air scattering. The scattering curves were converted to "constant thickness" by using external standard (PE film).

DMA

The film samples with thicknesses in the range 50μ-100μ were analyzed on a Rheometrix Solids Analyzer DMA V. One of the materials, Code4, was prepared with thickness ~1 mm. The measurements were executed at room temperature in a frequency sweep mode (1 Hz to 10 Hz) by increasing the loads until the failure of the materials.

EXAMPLES

Example 1

To about 10 grams of polyethylene pellets are added 0.05 grams of 4,5-dibromofluorescein and the mixture heated to 130° C. and stirred to mix the dye into the liquid polymer. This colored mixture is then allowed to cool. Chunks of this mixture are then placed between sheets (14"×14") of aluminum foil and placed in a Carver hot plate press (The Carver Press Company, Columbus Ohio) where the plates had been heated to 140° C. The polymer between the sheets are pressed to 4000 lb and held for 1 minute. After the polymer film samples were allowed to cool the circular films were removed from the foil. Samples of the film were then taken and analyzed using dynamic mechanical analysis (DMA) and thermogravimetric analysis (TGA) techniques.

Example 2

About 10 grams of polyethylene pellets are heated to 130° C. and stirred for the same amount of time as example 1. After cooling chunks of this solid was then placed between sheets (14"×4") of aluminum foil and placed in a Carver hot plate press where the plates had been heated to 140° C. The polymer between the sheets is pressed to 4000 lb and held for 1 minute. After the polymer film samples are allowed to cool the circular films were removed from the foil.

Comparative Example

In a comparative example, we show that for low crystalline materials, the plasticizing effect of incorporating xanthene or xanthene-based compounds into a conventional thermoplastic polymer is not automatic. Rather, transformation in the formulation and plastic properties of the thermoplastic material exhibits inventive and non-inherent qualities of the present invention in light of this result. About 5000 ppm of a xanthene dye is melt-mixed with low-density polyethylene (<1% crystalline). The samples were analyzed on a TA Instruments Differential Scanning Calorimeter (DSC) Q 2000 (T-zero (cell) using the following experimental procedure: Approximately 5 mg cut from the films were encapsulated in the DSC pans. The specimens were run in the temperature interval of about −100° C. to 200° C. with a heating/cooling rate of 10° C./min. All measurements were executed in an inert gas (He) atmosphere.

Figure 2:
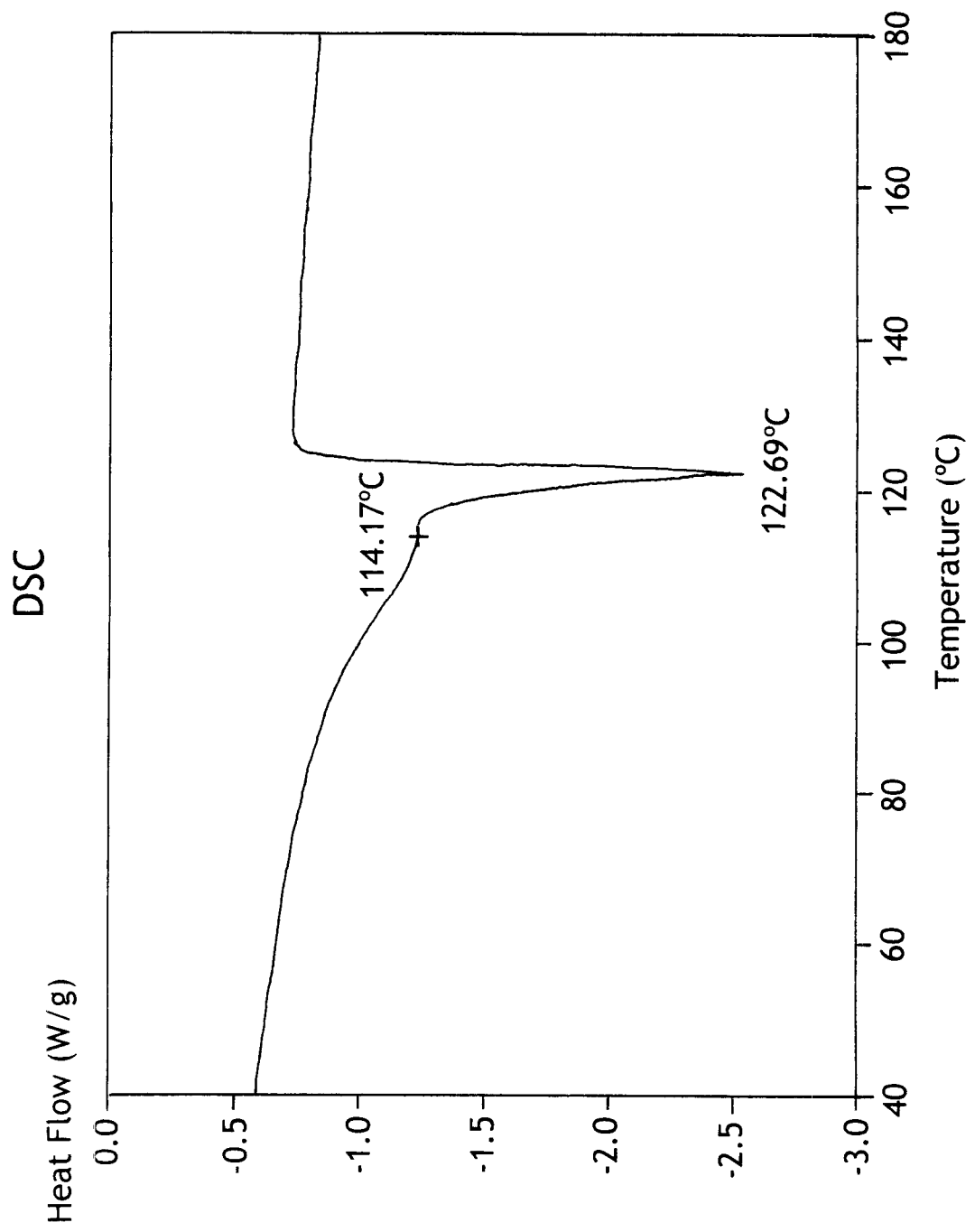
FIG. 2 is a heating curve for the polyethylene of FIG. 1, with about 5000 ppm of a xanthene dye incorporated therein.

Sample Identification:
Film 1—low-density polyethylene control (>5% crystalline)
Film 2—low-density Polyethylene+5000 ppm dye The DSC heating curve of Film 1 (PE control) is characterized with a melting peak centered at ~123° C. and a low temperature shoulder—FIG. 1. This melting temperature is typical for linear low density polyethylene (LLDPE). The heating curve of Film 2 (PE+dye; FIG. 2) is similar to the results plotted in FIG. 1, thus it appears that the 5000 ppm dye does not influence the thermal properties of the material.

The present invention has been described both generally and in detail by way of examples and the figures. Persons skilled in the art, however, can appreciate that the invention is not limited necessarily to the embodiments specifically disclosed, but that substitutions, modifications, and variations may be made to the present invention and its uses without departing from the spirit and scope of the invention. Therefore, changes should be construed as included herein unless the modifications otherwise depart from the scope of the present invention as defined in the following claims.

We claim:

1. A thermoplastic polymer composition comprising: a semi-crystalline polymer with a minimal crystalline content of about 7% to about 80% by weight of the polymer, and a plasticizing compound with a xanthene-based molecular structure in an amount up to about 4% dispersed therein, and said composition having a mesophase, a crystalline phase, and an amorphous phase in a ratio range of about 1-5:5-9:8-12, respectively when solid at ambient room temperature, wherein said semi-crystalline polymer is selected from a group consisting: polypropylene, polyvinyl chloride, polylactic acid, polystyrene, or high-density polyethylene.

2. The thermoplastic polymer composition according to claim 1, wherein said plasticizing compound has at least one R group, where R is hydrogen or a halogen.

3. The thermoplastic polymer composition according to claim 1, wherein said xanthene-based molecular structure is halogenated or mixed-halogenated.

4. The thermoplastic polymer composition according to claim 1, wherein said plasticizing compound is present at about 500 ppm (0.05 wt. %) to about 20,000 ppm (2 wt. %).

5. The thermoplastic polymer composition according to claim 1, wherein said plasticizing compound is present in an amount of up to about 1.75 wt. % or 1.8 wt. %.

6. The thermoplastic polymer composition according to claim 1, wherein said mesophase and said crystalline phase are each reduced by an amount of about 10-50% relative to the percentage of mesophase and crystalline phase of an identical composition absent said plasticizing compound with xanthene-based molecular structure.

7. The thermoplastic polymer composition according to claim 1, wherein said composition can increase the stress-strain tolerance relative to an underlying thermoplastic polymer not having said plasticizing compound by about at least 7%.

8. The thermoplastic polymer composition according to claim 1, wherein said composition increases in the stretch elongation tolerance relative to an underlying thermoplastic polymer not having plasticizing compound by about at least 5%.

9. The thermoplastic polymer composition according to claim 1, wherein said composition exhibits an increase in the tolerance to an amount of shear force (lb.F.) applied to pull apart said polymer relative to an underlying thermoplastic polymer not having plasticizing compound by at least 5%.

10. A film made from an extrusion of a thermoplastic composition according claim 1.

11. An article molded from a thermoplastic composition according claim 1.

* * * * *